Aug. 4, 1953     R. M. KRAUS     2,647,805

DISK HARROW GANG AND BEARING

Filed Feb. 7, 1949     2 Sheets-Sheet 1

INVENTOR.
Raymond M. Kraus
BY
Harry P. Canfield
ATTORNEY.

Aug. 4, 1953     R. M. KRAUS     2,647,805
DISK HARROW GANG AND BEARING
Filed Feb. 7, 1949     2 Sheets-Sheet 2
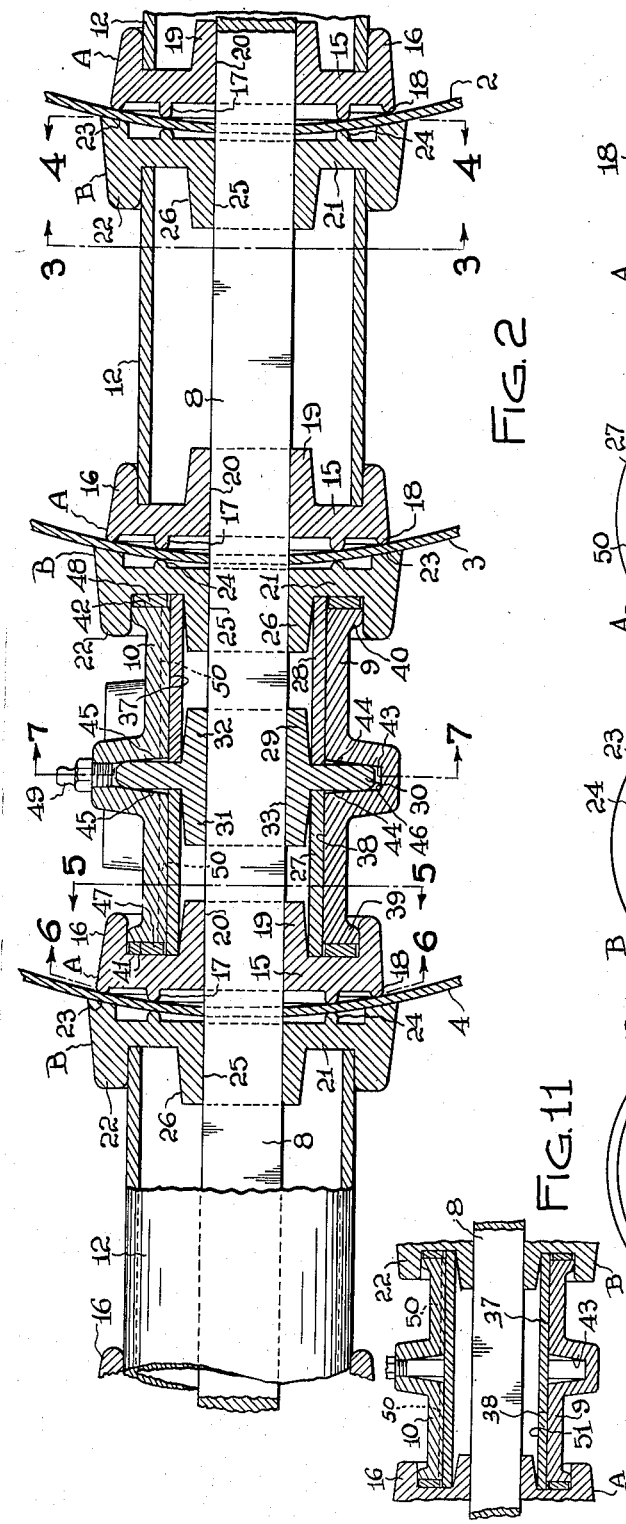
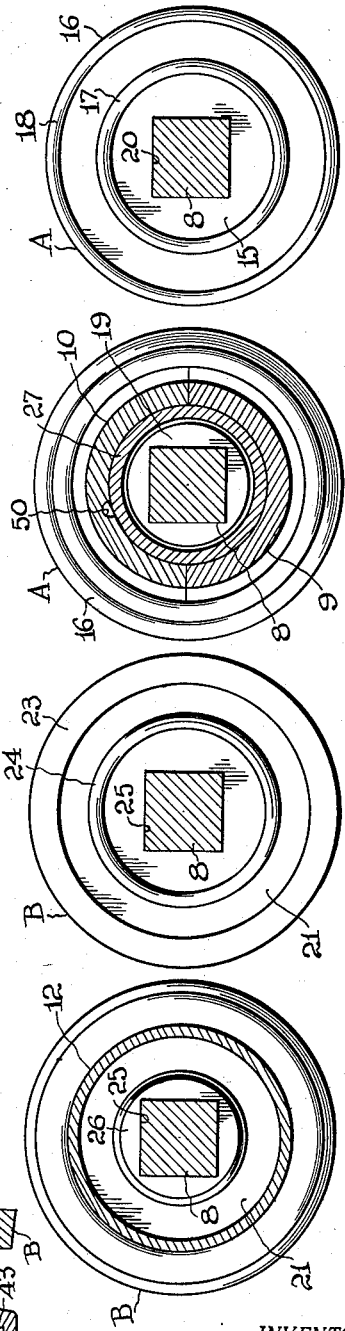
INVENTOR.
Raymond M. Kraus
BY
ATTORNEY Patented Aug. 4, 1953

2,647,805

UNITED STATES PATENT OFFICE 2,647,805

DISK HARROW GANG AND BEARING

Raymond M. Kraus, Cleveland, Ohio, assignor to The Dunham Company, Berea, Ohio, a corporation of Ohio Application February 7, 1949, Serial No. 74,909

3 Claims. (Cl. 308—19)

This invention relates to the rotary disc gangs of disc harrow and like agricultural implements. Such a disc gang comprises a plurality of dished soil working discs alternating with spacers between adjacent discs, and a shaft in the nature of a long bolt passing through center holes in the discs and spacers and drawing or clamping them together longitudinally of the shaft in a rigid unit.

To mount the gang on the disc harrow implement, one or more of the spacers have a special construction and constitute the inner rotary part of a bearing, and corresponding hangers depend from the frame and carry the sleeve or stationary outer part of the bearing.

Such bearings and spacers must be cheap to manufacture so as not to add unduly to the overall cost of the implement; and cheapness has heretofore been sought by making the parts from cast iron, designed to go together with little or no machine work on the cast parts. But some of the saving thus effected by casting the parts is lost in scrap because of unusable castings. The inner rotary part of the bearing for example, by its very nature, must be cylindrical; and has heretofore been molded from a two part pattern, which leaves longitudinal ridges or fins on it at the parting line of the mold, and these must be removed by machining or grinding or filing; and this adds the cost of an operation, and destroys the cylindrical contour, so that it cuts the sleeve part of the bearing in which it rotates. Also there is the ever present liability that the two parts of the mold will shift enough to make the two halves of the casting overlap instead of coinciding in a cylinder, resulting in a casting that cannot be salvaged.

Also, the ends of the said spacers as well as the ends of the cast rotary part of the bearing, against which the concavo-convex discs are clamped, have heretofore had corresponding convexo-concave surfaces to grip the disc, and these generally require a dry sand core to form them which adds to production cost.

Also, since the cylindrical rotary cast part of the bearing is seldom a true cylinder, it presents a difficult problem of lubrication.

In the disc gang of the present invention, which has been made to solve these and other problems, the rotary part of the bearing is made of steel tubing to insure a true cylindrical bearing surface; and the ends of the rotary part are separate, generally circular, pieces and therefore can be cast from a one piece pattern drawn axially from the sand. The spacers similarly comprise like or similar end pieces and a tubular steel spacer element therebetween. The parts are made to go together in a simple manner without bolting, riveting, or special operations, and as will be explained hereinafter, the longitudinal clamping action to draw all of the parts of the gang together is utilized to hold the separate parts of each spacer and of the rotary bearing, in assembled relation, by what is believed to be a unique and labor-saving part of the invention, and ample lubrication is made possible in a simple manner. Long wearing life of the parts is provided for.

In prior bearings, the waste due to imperfections and cost of casting the ends of the rotary bearing part and of the spacers to approximately fit the dished discs, as referred to, is here eliminated. The separate opposite end pieces, referred to, of the rotary part of the bearing are adapted to be used also in duplicate as the opposite end pieces of the spacers, being simply mounted on the opposite ends of a length of tubing to constitute the spacer.

The invention therefore comprises a disc gang having spacers and a bearing embodying among others, the improvements mentioned above; and the objects of the invention are believed to be apparent from the foregoing.

The invention itself is set forth in the claims.

The invention is fully disclosed in the following description taken in connection with the accompanying drawing in which:

Fig. 2 is a longitudinal sectional view to a larger scale of a part of Fig. 1;

Figures 8, 9:
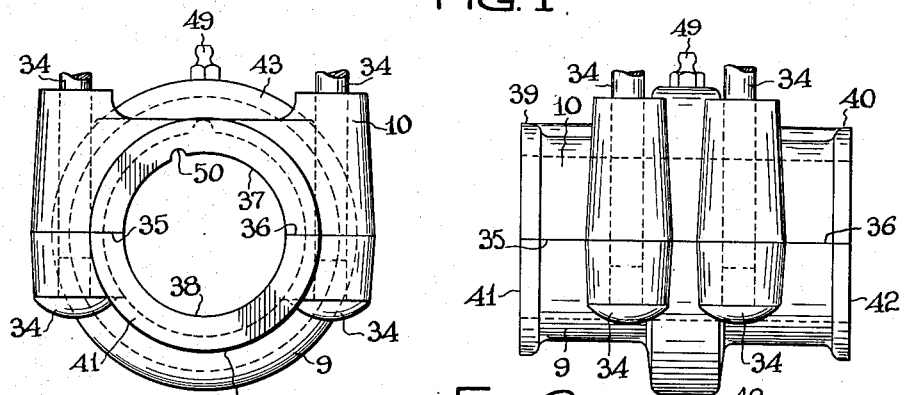
Figure 7:
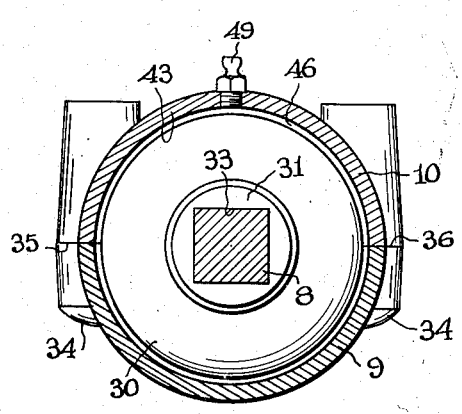
Figure 10:
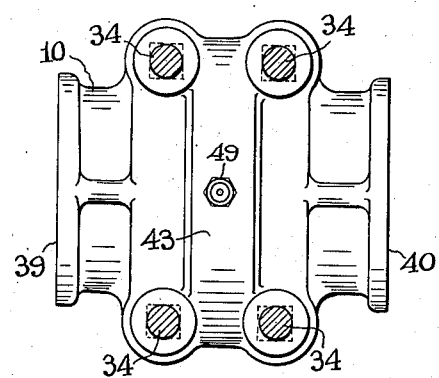

Figs. 3, 4, 5, 6, and 7 are cross sectional views taken respectively from the planes 3—3, 4—4, 5—5, 6—6, and 7—7 of Fig. 2;

Figs. 8, 9, and 10 are respectively front elevational, top plan, and end elevational views of bearing elements shown in section in Fig. 2; and with attaching bolts therefor broken off;

Fig. 11 is a view similar to a part of Fig. 2 but to smaller scale and showing a modification.

Figure 1:
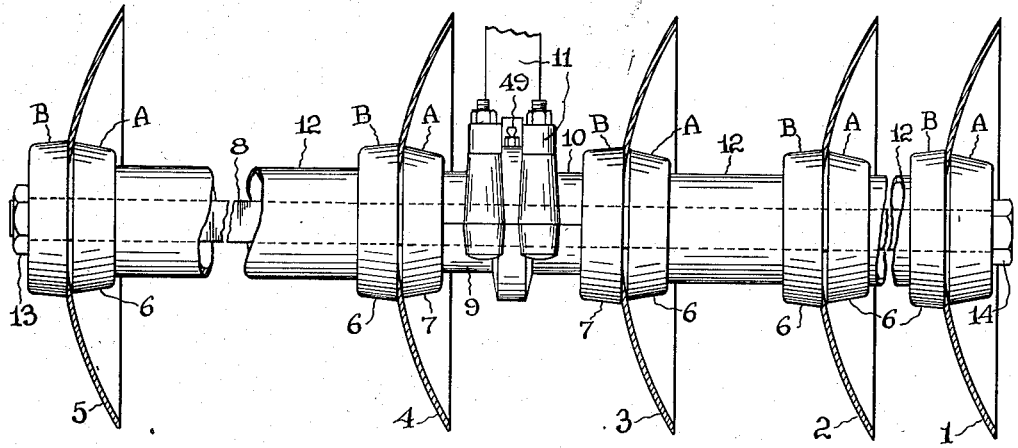
Fig. 1 is a front elevational view, with parts broken away, of a disc gang embodying the invention.

Referring to the drawing, Fig. 1 illustrates a disc gang in which my invention is embodied. In general it comprises a plurality of discs five being shown at 1 to 5 inclusive spaced apart by spacer devices 6—6—6 and 7 and all rigidly clamped together longitudinally by a long bolt or shaft 8, extending axially therethrough.

The spacer device 7 is different in construction from those at 6—6 and constitutes the inner or rotary part of a sleeve type bearing. The stationary outer or sleeve part is in two halves shown at 9 and 10, bolted together and to a bracket 11 depending from the frame of the disc harrow implement not shown.

In practice, the disc gang rolls on the surface of the ground (or at a suitable working depth therein) and by means of the bracket 11 supports the implement frame. There may be only one gang for the implement; but usually, in implements to which the invention is particularly well adapted, pairs of gangs are provided at opposite sides of the implement and there may be several such pairs.

The gang of Fig. 1 has only five discs, but may have more; and while only one bearing 7—9—10 is shown, there may be more, spaced longitudinally along the gang.

In assembling the parts of the gang together, they are all strung along or telescoped over the shaft 8, say from left to right, and against a head or nut 14 on the shaft 8. A circular part A, the disc 1, and a circular part B, are successively put on the shaft; followed by a spacer 12. Another circular part A, the disc 2, another circular part B, and a spacer 12 are then put on; and so on for successive discs.

It will be noted that each spacer device 6 comprises a circular part A on the concave face of the disc and a circular part B on the convex face, and a spacer 12 between them.

At the bearing 9—10, there are also the same circular parts A and B, and a spacer therebetween not shown in Fig. 1, but constituting the rotary part of the bearing.

When the last disc 5 and the last circular part B are put on the shaft 8, a nut 13 is screwed on the shaft engaging the part B, and when turned draws all of the parts together on the bolt or shaft 8.

The shaft 8 is preferably square in cross section (except where the nut 13 is threaded on it) and, as will be referred to, the circular parts A and B as well as the discs preferably have square holes in them, so that all of the discs of the gang are constrained to rotate as a unit. The shaft 8 may have a head 14 on the other end, or the head 14 may be a threaded nut; and any well known device may be provided to lock the nuts against loosening.

Referring now to Figs. 2 to 7, where the foregoing parts are shown to larger scale and in more detail, the circular part A has a circular disc like body 15; an outer peripheral flange 16 on one face of the body; a pair of concentric ribs or beads 17 and 18 of different diameters on the other face of the body; and a generally cylindrical central hub 19 at the center of the body, extending through which is a coaxial square hole 20. The hole 20 is sized to slidingly receive the square shaft 8.

The bead 17 projects farther axially from the body 15 than the bead 18, by an amount predetermined so that both beads will at the same time engage the concave face of the disc, for example the disc 2 as shown in Fig. 2.

The circular part A is designed to be cast cheaply from cast iron, and to this end, the pattern therefor is made to be drawn axially from the sand without coring; although in some cases it may be desirable to form the square hole 20 by a core.

The circular part B is similar to the part A, comprising a body 21 having a peripheral flange 22, an outer bead 23, an inner bead 24, and square hole 25 in a central cylindrical hub 26. The bead 23 is farther from the body 21 than the bead 24, so that they concurrently engage or fit the convex face of the disc, say the disc 2 as shown. This part likewise can be cheaply made by casting.

It will be clear that the two parts A and B when clamped upon opposite faces of the disc 2 will grip it therebetween on their respective pairs of beads, so that rotation of the disc will be transmitted to the shaft 8.

The spacer 12 is simply a piece of steel tubing cut off square at its ends and to the desired length; and of a diameter that will fit within the peripheral flanges 16 and 22 of the parts A and B to dispose it coaxially.

As to the bearing between the discs 3 and 4, there is a part B on the convex side of the disc 3 and a part A on the concave side of the disc 4. Between them, and spacing them and the discs apart, is the rotary inner bearing part, in the form of a steel tube. Preferably it is made of two pieces of tubing 27 and 28, coaxially aligned, and abutting at their outer ends upon the bodies 15 and 21 of the parts A and B, and abutting at their inner ends upon a central thrust element 29 having an annular rib 30 around it.

The outer ends of the tubing pieces 27 and 28 are centered and disposed coaxially by telescoping them over the hubs 19 and 26 of the parts A and B; and to this end the hubs 19 and 26 may be slightly tapered so that the tubes 27 and 28 will fit them tightly when forced thereon. The thrust element 29 comprises two axially opposite hubs 31 and 32 substantially like the hubs 19 and 26 with the said rib 30 between them. The inner ends of the tubes 27 and 28 fit upon the hubs 31 and 32 and about upon the rib 30. A square hole 33 through the hubs fits the shaft 8.

A sub-assembly may be made up of the parts 27, 28, and 29, by pressing the tubes 27 and 28 on the hubs 31 and 32 of the element 29; and the sub-assembly may be considered as a spacer or as the rotary part of the bearing.

The outer or stationary part of the bearing comprising the two halves or parts 9—10 of Figs. 1 and 2 is also shown separately in Figs. 8, 9, and 10. The two parts are bolted together by bolting them to the bracket 11 by means of four bolts 34—34 extending through aligned cored holes in the parts and through corresponding holes in the bracket 11. They contact each other on planar faces 35—36; and have respectively concave semi-cylindrical surfaces 37—38, providing a cylindrical bearing bore rotatively fitting the rotary bearing tubes 27—28. At their opposite ends the parts 9—10 considered jointly have flanges 39—40 faced off square to provide end faces 41—42.

At their mid-portion, the parts 9 and 10 are formed with an inwardly open circular channel 43 into which the circular rib 30 projects. The side faces 44—44 of the rib 30 have very small clearance with the side walls 45—45 of the channel, but a large clearance is provided between the periphery of the rib and the channel bottom, providing an annular chamber 46 all around the periphery of the rib 30.

The overall axial length of the outer bearing part 9—10 is made less than that of the inner part or spacer 27—28—29, whereby the spacer may be rigidly clamped between the parts A and B, and rotate with respect to the stationary 9—10 of the bearing without binding on the ends of the stationary part.

The bearing construction, besides providing for rotation of the gang, must take up endwise thrust thereof. This is particularly true when, as in practice, the gang is set on the implement at an angle to its forward direction of movement and great end thrust develops.

In the bearing construction above described, end thrust is provided between the side faces 44—44 of the rib 30 and the side walls 45—45 of the channel 43; end thrust bearing is also provided between the ends 41—42 of the outer bearing part 9—10 and the bodies 12—21 of the parts A and B. Preferably the latter end thrust is taken on washers 47 and 48 lying upon the bodies 15 and 21 of the parts A and B and loosely trapped against excess radially shifting outwardly by the flanges 16 and 22 and inwardly by the tubes 27 and 28. These washers being loose may remain stationary with the outer bearing part 9—10, or may rotate with respect to it, and alternatively from time to time, thus distributing the wear. Instead of single washers 47—48, multiple washers may be used.

Bearings of this general class for agricultural implements are not precision bearings; and the parts must be adapted to be made and assembled with the minimum of cost, and still function. In the present bearing, it is not expected that there will be engagement of the rib 30 with the channel walls 45—45 and also engagement of the parts A and B with the ends of the stationary bearing part 9—10 when the bearing is first made and assembled; because of the precision work that that would require; but engagement at one or the other will be present and after a period of use and wear, both will come into engagement.

The engagement at the washers 47—48 is obviously adjustable by means of washers of different thicknesses.

Provision is made in the bearing to prevent the entrance of dirt into the bearing surfaces and to keep the same lubricated.

As the discs rotate, they elevate loose soil and it drops on the bearing. The only place that dirt could enter the bearing is around the ends 41—42 of the stationary part 9—10; and to enter here it would have to work its way upward and around and over the flanges 39 and 40 and under the flanges 16 and 22. The flanges 16 and 22 are externally tapering as shown and overlap the flanges 39 and 40 and thus shed the falling soil toward the middle of the bearing and away from said ends.

Lubricant such as grease is injected under pressure through a nipple 49 into the annular chamber 46, along both faces of the rib 30 to lubricate them; and thence to the bearing surfaces 37 and 38 to lubricate them. Ducts 50—50 (Figs. 2, 5, and 9) are cast in the bearing surface 37 of the part 10 of the bearing, open at the opposite ends thereof and inwardly communicating with the channel 43. Some of the lubricant is forced from the channel 43 directly through these ducts to further distribute it over the bearing surfaces 37 and 38. Some of this lubricant is also supplied to the end thrust bearings at the ends of the stationary bearing part 9—10; and thence is forced out under the flanges 16 and 22 and purges them of any small amount of soil or dust which may have crept in at that point.

Thus the whole bearing can be flushed out, cleaned, and lubricated from time to time. Between times, the chamber 46 acts as a lubricant reservoir to keep the bearing parts from becoming dry.

It is well known that the engaged parts of bearings wear less and have less of a tendency for one to "cut" the other, when they are of different materials. That advantage is had in the present bearing. The rotary part 27—28 is of steel tubing, and the sleeve part around it has bearing surfaces 37—38 of cast iron. Also at the ends of the bearing, the washers 47—48 are of steel, and the parts A and B and the ends 41—42 of the bearing part 10 are of cast iron.

In Fig. 11 is shown a modification in which the end thrust element 29 is omitted. The rotary part of the bearing, acting also as a spacer is a single piece of steel tube 51 substituted for the two pieces 27—28 of Fig. 2. Otherwise the parts of the bearing may be the same as in Fig. 2 and need no further description. The channel 43 is retained as a lubricant reservoir to feed the duct 50 and the bearing surfaces 37—38.

I claim:

1. In an agricultural disc gang, a plurality of concavo-convex soil working discs, and a plurality of spacing devices, alternating in a series, and held together longitudinally by clamping means extending therethrough; the spacing devices comprising each, a pair of cast metal parts, one having a plurality of concentric circular beads engaging the concave face of one disc, and the other having a plurality of concentric circular beads engaging the convex face of the next adjacent disc, and cylindrical steel tube spacer means abutting at its ends upon the said two parts; and coaxial confronting generally cylindrical portions on the said two parts telescoped with the ends of the tube spacer means and positioning them coaxially of the discs; and coaxial holes provided in the two parts for receiving a gang clamping element of said clamping means; one of said spacer means having cylindrical exterior surfaces constituting the rotary inner part of a bearing; an outer sleeve part for the bearing comprising a pair of cast metal bearing parts, one on each side of the said inner rotary bearing part and provided jointly with a cylindrical bore in which the cylindrical surfaces have rotary bearing; means to fasten the two bearing parts together; the two said spacing device parts having transverse gang-end-thrust transmitting surfaces, transverse steel washers rotatively loosely surrounding the said tubular bearing ends respectively and engaging said transverse surfaces; and axially opposite end portions of the two bearing parts having transverse surfaces engaging the washers and receiving end thrust transmitted through the washers.

2. In an agricultural disc gang, a plurality of concavo-convex soil working discs, and a plurality of spacing devices, alternating in a series, and held together longitudinally by clamping means extending therethrough; the spacing devices comprising each, a pair of cast metal parts, one engaging the concave face of one disc, and the other engaging the convex face of the next adjacent disc, and a spacer having axially aligned tubular ends abutting upon the said two parts; and means on the said two parts positioning the said tubular ends coaxial of the discs; and coaxial holes provided in the two parts for receiving a gang clamping element of said clamping means; one of said spacers having cylindrical exterior surfaces constituting the rotary inner part of a bearing an outer sleeve part for the bearing comprising a pair of cast metal bearing parts, one on each side of the said inner rotary bearing part and provided jointly with a cylindrical bore in which the cylindrical surfaces have rotary bearing; means to fasten the two bearing parts together; the two said spacing device parts having transverse gang-end-thrust transmitting surfaces, and axially opposite end portions of the two bearing parts having transverse end thrust surfaces receiving thrust transmitted thereto; the pair of outer bearing parts provided with a lubricant chamber communicating with the bearing surfaces of the inner bearing part; an axially extending channel duct in the wall of the said cylindrical bore of the outer bearing part communicating at one end with the chamber and at the other end with the end thrust surfaces of the outer bearing part.

3. A bearing construction for an agricultural disc gang comprising: a pair of cast metal parts, one engaging the concave face of one disc and the other engaging the convex face of the next adjacent disc; an end thrust element between and axially spaced from the two said parts; a pair of metal tubes, one abutting at its opposite ends upon one said part and the end thrust element, and the other upon the other said part and the end thrust element; means on the said parts and end thrust element disposing the two tubes in axial alignment and coaxial of the discs; the end thrust element having a circumscribing rib thereon; a stationary bearing element comprising concave cylindrical bearing surfaces surrounding the two tubes and having an annular channel into which the circumscribing rib projects; end thrust bearing surfaces on the channel side walls and rib; and end thrust bearing surfaces on the axial ends of the stationary bearing element and on the said pair of cast metal parts.

RAYMOND M. KRAUS.

References Cited in the file of this patent
UNITED STATES PATENTS

| Number | Name | Date |
|---|---|---|
| Re. 21,145 | Goble | July 11, 1939 |
| 861,704 | Brew | July 30, 1907 |
| 2,062,947 | Stair | Dec. 1, 1936 |
| 2,247,685 | Hipple | July 1, 1941 |
| 2,294,234 | Johnston | Aug. 25, 1942 |
| 2,501,068 | Magarian | Mar. 21, 1950 |